United States Patent
Merola

[11] 3,771,826
[45] Nov. 13, 1973

[54] ADJUSTABLE MATERIAL HANDLING DEVICE

[75] Inventor: Anthony Merola, Pittsburgh, Pa.

[73] Assignee: Amerola Products Corporation, Pittsburgh, Pa.

[22] Filed: Nov. 10, 1971

[21] Appl. No.: 197,223

Related U.S. Application Data
[63] Continuation-in-part of Ser. No. 825,369, May 16, 1969, Pat. No. 3,653,708.

[52] U.S. Cl............ 294/114, 294/81 R, 294/102 R
[51] Int. Cl..........................................B25b 3/00
[58] Field of Search.................. 294/81 R, 85, 86 R, 294/99 R, 101, 102, 104, 114, 116; 24/263 SW, 244; 269/217, 229, 232, 235

[56] References Cited
UNITED STATES PATENTS
| 1,312,926 | 8/1919 | Sherman............................. 294/103 |
| 2,318,242 | 5/1943 | Matteson et al..................... 294/114 |
| 2,647,007 | 7/1953 | Gmoser et al...................... 294/81 R |

FOREIGN PATENTS OR APPLICATIONS
| 726,000 | 8/1942 | Germany............................ 269/231 |
| 934,560 | 8/1963 | Great Britain................. 294/DIG. 2 |

Primary Examiner—Evon C. Blunk
Assistant Examiner—Johnny D. Cherry
Attorney—Walter G. Sutcliff

[57] ABSTRACT

A material handling device with an adjustable engagement span for handling work pieces of varying dimensions. The device utilizes a pair of confronting converging plate members with associated friction rollers for engaging the workpiece, with at least one of the plate members depending from a base member which is slidably mounted upon a frame member. The base member is slidable to adjust the span between the converging plate members and the friction rollers associated therewith, whereby the device can be used to engage workpieces of various dimensions.

8 Claims, 3 Drawing Figures

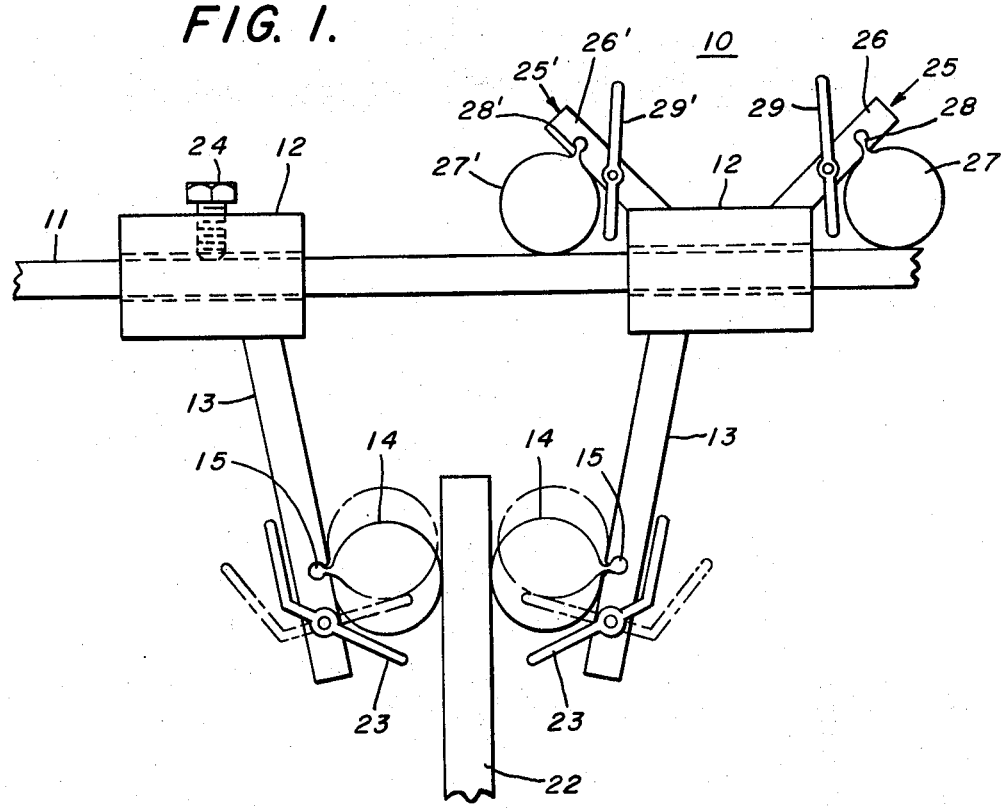
FIG. 1.
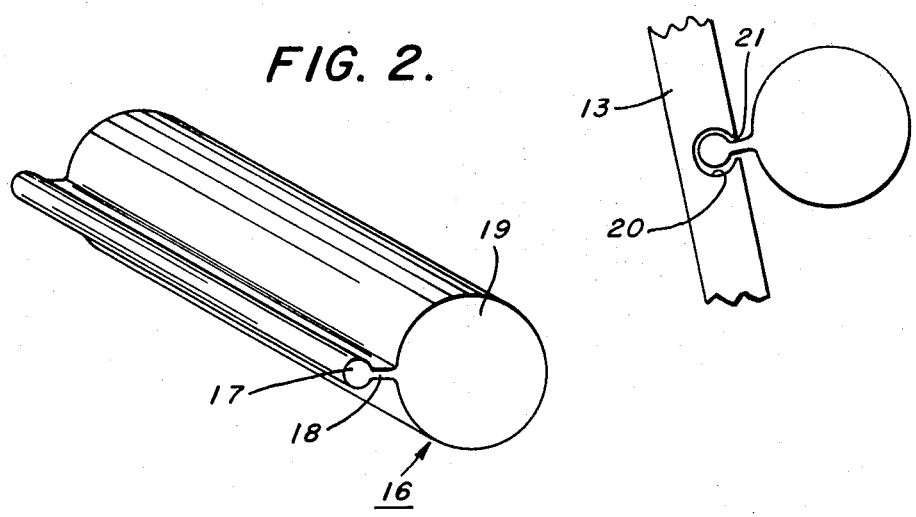
FIG. 2.
FIG. 3.

ADJUSTABLE MATERIAL HANDLING DEVICE

CROSS REFERENCE TO RELATED APPLICATION

This application is a continuation-in-part application of copending application Ser. No. 825,369 filed May 16, 1969, now U.S. Pat. No. 3,653,708, entitled "Gripping Device."

BACKGROUND OF THE INVENTION

The aforementioned copending application details a material handling gripping device, which can be used for a wide variety of purposes, and is usable with a variety of workpieces such as sheets of metal, paper, glass, or blocks and pallets of bundled material. The teachings of the aforementioned copending application are to be incorporated by reference into the present application. The present improvements relate to a provision by which the gripping device is made more readily adjustable to facilitate quick and easy adaptation of the device to the varying shapes and sizes of materials to be handled.

SUMMARY OF THE INVENTION

An adjustable material handling device for handling workpieces of varying dimensions comprising a frame member including a pair of confronting, converging plate members constituting roller surfaces which terminate in spaced relationship to each other to provide an opening for admitting the workpiece therebetween. At least one of the plate members extends from an adjustable base member movably mounted on the frame member, whereby the base member is movable along the frame to adjust the spaced relation of the plate members. A pair of friction rollers, each of which is respectively associated with confronting roller surfaces to act as the engagement means for the handling device. The friction rollers are directly connected to the plate members by resilient means associated with each set of friction rollers and roller surface, with the rollers being maintained in opposed parallel relationship to each other and biased against its associated roller surface in the direction perpendicular to the surface when the roller is in rest position.

BRIEF DESCRIPTION OF THE DRAWINGS

FIG. 1 is a side elevational view of an embodiment of the adjustable gripping device of the present invention.

FIG. 2 is an enlarged perspective view of an integral roller and resilient means according to one of the preferred embodiments of the present invention.

FIG. 3 is a fragmentary enlarged side view of the integral roller and resilient means fitted to the plate member.

DESCRIPTION OF THE PREFERRED EMBODIMENTS

The invention can be best understood by reference to the exemplary embodiment shown in the drawings. In FIG. 1, the material handling assembly 10 comprises a supporting frame 11 upon which are slidably mounted base members 12. Primary plate members 13 extend downwardly from respective base members 12. The plate members 13 are inclined toward each other to provide confronting, converging support surfaces. A primary friction roller 14 is associated with respective primary plate members 13, with resilient means 15 retaining the rollers 14 proximate the members 13 with the rollers 14 being maintained in opposed, parallel relationship to each other and biased by the resilient means 15 against the associated roller surface of the plate members 13 in the direction perpendicular to the surface when the rollers are in rest position. The resilient means 15 disclosed in the aforementioned copending application comprised a resilient band which was wrapped about the roller and was secured to the primary plate. Such resilient means can also be used in the present embodiment.

An improved integral resilient means and primary roller means 16 is shown in perspective in FIG. 2, and in a fragmentary side view of FIG. 3 in conjunction with the primary plate member 13. The integral resilient and roller means 16 comprises a first cylindrical portion 17, which is tangentially joined by resilient connecting portion 18 to a second cylindrical portion 19 which acts as the primary roller when the first cylindrical portion 17 is fitted within channel 20 formed in primary plate 13. The connecting portion 18 extends through channel opening 21 in plate 13 and a second cylindrical portion 19 is thereby biased against the surface of plate 13.

The operation of the adjustable gripping device is essentially the same as described in the aforementioned copending application. A sheet 22 of material is insertable between the opposed primary rollers 14, and the rollers are movable upwards along the surface of plates 13, however once sheet 22 has thus been inserted, any attempt to remove it by a downward motion from between the rollers is forestalled by the convergence of the rollers 14 upon the plates 13. A release lever 23 which is pivotally connected to at least one plate 13 is movable to force roller 14 upward along the surface of plate 13 to allow sheet 22 to be withdrawn. The resilient means 15 permits such limited movement of the rollers 14.

The present invention is more specifically directed to providing a greater variability or adjustability of span opening between the plates 13 and the rollers 14 than is provided solely by elongation of the resilient means 15. The slidable base member 12 at the left hand side of FIG. 1 can be readily moved in either direction to increase or decrease the span of the gripping device with a fastening means 24 such as a hold down bolt which extends through the base member 12 to engage the frame member 11 whereby the base member can be maintained in a set position during use.

The adjustment means associated with at least one of the slidable base members 12 can also comprise a secondary plate and roller assembly 25 which acts very much like the article engaging rollers 14 and the primary plate members 13 in opposing movement in a given direction. The secondary plate and roller assembly 25 comprises secondary plate 26 which extends generally upward from the top surface of the base member 12 and is aligned at an acute angle with respect to the frame member 11. A secondary roller 27 is supported between the secondary plate 26 and the frame 11 by resilient means 28 as shown at the right hand side of FIG. 1. An integral resilient means and friction roller such as 16 can be used for secondary roller 27 and resilient means 28 in assembly 25. The secondary plate and roller assembly 25 will prevent movement of the adjustable base member 12 in the direction of convergence of secondary plate 26 and frame member 11. A release means 29 is again provided to urge the roller in the direction opposite to the convergence of the secondary plate and the frame to allow for the base member to be in fact adjusted in either direction.

Another secondary plate and roller assembly 25' can also be used alone or in conjunction with assembly 25 for providing ready adjustment of base member 12 and locking of base member 12 in place. The assembly 25' is a mirror image of assembly 25. A roller surface plate 26' extends from base member 12 at an acute angle with respect to frame member 11. The roller 27' and resilient means 28' again comprise an integral roller and resilient means 16.

Each of the assemblies 25 and 25' restrain the base member 12 from movement, but they restrain movement in opposite directions so that the combination provides a positive locking in place of the base member 12. In order to move base member 12 in either direction it is necessary to use release means 29 or 29' to urge rollers 27, 27' in the directions away from the convergence of respective plate 26 and frame 11 and plate 26' and frame 11.

The integral roller and resilient means described herein provides a superior structural means. The integral roller and resilient means is preferably molded of rubberous material. It is not essential that the first cylindrical portion extend along the entire length of the second cylindrical portion which comprises one of the friction rollers. The integral roller and resilient means can be inserted into the channel provided in the plate member from one end of the plate, and a locking plate may be provided at the side of the plate to insure retention of the first cylindrical portion within the channel provided.

The ability to vary the spacing between the friction rollers beyond the stretching of the resilient means which retains the respective roller to its associated roller surface greatly increases the versatility of the subject material handling device. The slidably mounted base member mounted on the longitudinally extending frame member provides a simple and easily adjustable means by which the span or spacing between the friction rollers can be increased up to approximately the longitudinal extent of the frame member.

I claim:

1. A material handling device with an adjustable engagement span for handling workpieces of various dimensions comprising:
   a. a frame member including a pair of confronting converging plate members constituting roller surfaces, terminating in spaced relation to each other to provide an opening for admitting the workpiece therebetween, with at least one of the plate members extending from an adjustable base member movably mounted on the frame member whereby the base member is movable along the frame to adjust the spaced relationships of the plate members to fit various workpieces;
   b. a pair of friction rollers, one associated with each confronting roller surface, and
   c. resilient means directly connecting each of the rollers to its associated roller surface in opposed parallel relationship to each other, and biasing each roller against its associated roller surface, in the direction perpendicular to the surface when the rollers are at rest position, the resilient means, in conjunction with associated roller surfaces, constituting the sole support for the rollers on the frame, the arrangement further being such that, upon insertion of a workpiece through the opening into engagement with the rollers, the resilient means will bias the rollers simultaneously against both the workpiece and the roller surfaces to frictionally engage the workpiece and the roller surfaces to frictionally engage the workpiece whereby forces acting to separate the workpiece from between the rollers, in a direction perpendicular to the roller axes and in the direction of convergence of the plate members, will increase the gripping force applied by the rollers co-acting with the frame.

2. The device specified in claim 1, wherein adjustable base member includes a secondary plate member extending therefrom at an acute angle with respect to the frame member, with a secondary roller resiliently held against the secondary plate member between said plate member and the frame whereby movement of the base member in the direction of convergence of the secondary plate and the base member is restrained, and wherein release means are included for urging the roller in a direction opposite to the direction of convergence of the secondary plate and the base member.

3. The device specified in claim 2, wherein another such secondary plate member and roller assembly is associated with the adjustable base member, with the other such secondary plate and roller assembly disposed in mirror image relationship to the original secondary plate member and roller assembly, whereby the adjustable base member is restrained from movement in either direction unless the release means are actuated.

4. The device specified in claim 1, wherein an integral resilient means and friction roller is provided comprising first and second generally cylindrical portions with the longitudinal axis of the portions being parallel, and a resilient tangential connecting portion between the first and second generally cylindrical portions, with the first cylindrical portion fitting and restrained within a channel formed in the plate member, the connecting portion disposed in a channel opening in the plate member, and the second cylindrical portion thereby supported adjacent the plate member to act as the article engaging means.

5. The device as specified in claim 1, wherein one such base member is adjustable along the frame member to adjust the spacing between the friction rollers.

6. The device as specified in claim 1, wherein both of the base members are adjustable along the frame member to adjust the spacing between the friction rollers.

7. In a material handling combination wherein a pair of friction rollers are resiliently connected to respective confronting, converging plate members whereby the friction rollers support an article therebetween by a wedging action of the rollers against respective plate members, the improvement comprising integral, unitary roller and resilient means which are mounted from respective plate members and comprise a generally cylindrical roller portion and a resilient tangentially extending appendage which is adapted to fit a restraining channel provided in the plate member.

8. The combination specified in claim 7, wherein the tangentially extending appendage comprises a resilient connecting portion and a generally cylindrical channel fitting portion, with the longitudinal axes of the generally cylindrical roller portion and the generally cylindrical channel fitting portion being parallel.

* * * * *